United States Patent [19]
Marhic et al.

[11] Patent Number: 4,598,191
[45] Date of Patent: Jul. 1, 1986

[54] VERY LOW POWER PLASMA ARC CUTTING EQUIPMENT

[75] Inventors: Gérard Marhic, Cergy; Francis Remy, Montigny-les-Cormeilles, both of France

[73] Assignee: L'Air Liquide, Societe Anonyme pour l'Etude et l'Exploitation Procedes Georges Claude, Paris, France

[21] Appl. No.: 716,195

[22] Filed: Mar. 26, 1985

[30] Foreign Application Priority Data

Apr. 4, 1984 [FR] France ................. 84 05285

[51] Int. Cl.⁴ .................................. B23K 9/10
[52] U.S. Cl. ................. 219/121 PW; 219/121 PC; 219/121 PT; 219/130.4
[58] Field of Search ............. 219/121 PT, 121 PU, 219/121 PV, 121 P, 121 PY, 76.16, 124.01, 130.4, 121 PC

[56] References Cited
U.S. PATENT DOCUMENTS

3,997,756 12/1976 Bykhovsky et al. ............ 219/121 P
4,107,507 8/1978 Schultz et al. ................ 219/121 PW
4,280,042 7/1981 Berger et al. ................. 219/121 PW

FOREIGN PATENT DOCUMENTS

0003482 8/1979 European Pat. Off. .
0014613 8/1980 European Pat. Off. .
2541166 4/1976 Fed. Rep. of Germany .
1549642 11/1968 France .
0136564 10/1980 Japan ................... 219/121 PW

*Primary Examiner*—M. H. Paschall
*Attorney, Agent, or Firm*—Young & Thompson

[57] ABSTRACT

The arc is struck by the initial short circuit between the electrode (2), the nozzle (3) and the work piece (7) by the excitation by a very low voltage source (31) of a relay (48) causing (between 43 and 42) the closure of the main contact (15), after which the relay (48) is maintained in its state by the welding or cutting current generating a voltage at the terminals of the inductance (23). Application in the control of a torch which is ignited by a short circuit between the electrode, nozzle and the torch.

8 Claims, 3 Drawing Figures

Fig:1

VERY LOW POWER PLASMA ARC CUTTING EQUIPMENT

The present invention relates to an installation for controlling a welding or cutting torch, of the type comprising an electrode and a nozzle mounted to have an axial travel into contact, with resiliently yieldable means for biasing towards a maximum distance apart for the normal mode of operation, said torch being, on the one hand, supplied by a source of electric welding or cutting current having one terminal connected to said electrode and the other terminal adapted to be connected electrically to the work piece to be welded or cut, and, on the other hand, supplied by a plasma-producing source. In this type of torch, the arc is ignited merely by applying the torch against the work piece to be welded or cut, which brings the electrode in contact with the nozzle which is itself in contact with the work piece, so that ceasing to apply the torch against the work piece moves the electrode away from the nozzle and creates an initial arc between the electrode and the nozzle, this arc being thereafter transferred between the electrode and the work piece. This type of ignition is considerably simplified with respect to the high-frequency igniting technique which is here completely absent.

An object of the invention is to still further simplify this type of installation by eliminating the starting up trigger and the associated electric connections which extend to within the torch body. This object is attained according to the invention by a very low voltage safety auxiliary electric source connected between the electrode and the work piece through an electric means for automatically causing the closure of a switch of the main welding or cutting current circuit which comes into initial action when the electrode is put in contact with the work piece to be welded through the torch nozzle and is maintained active by the existence of the main welding or cutting current. The means for maintaining active the means causing the automatic closure of the main welding or cutting current switch comprise a maintenance circuit which maintains the supply of current to said control means which is ensured by a voltage governed by the existence of the welding or cutting current, for example that obtained at the terminals of an impedance through which said main current passes.

There will be described hereinafter by way of non-limiting examples various embodiments of the present invention, with reference to the accompanying drawings in which.

Figure 1:
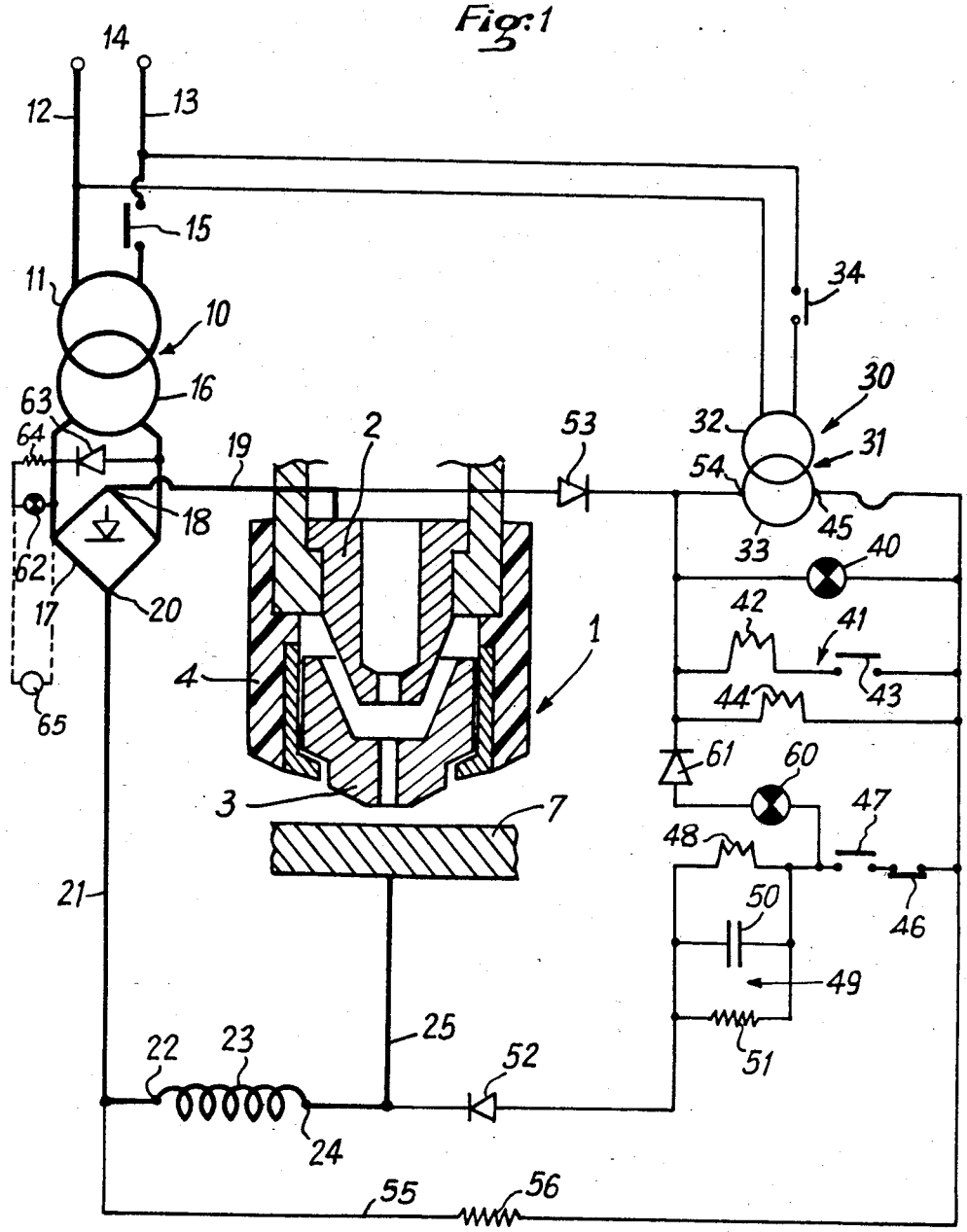
FIG. 1 is a diagrammatic view of an installation according to the invention.

With reference to FIG. 1, the installation concerns a torch 1 having an electrode 2 and a nozzle 3 which is slidably mounted in the torch body 4, and is insulated from the electrode 2. The torch 1 is here shown at a short distance from a work piece 7 to be welded or cut. The electric supply source of the torch is a transformer 10 whose monophas primary winding 11 is connected, through two conductors 12 and 13, to a mains supply 14 through an automatically controlled switch 15 which may moreover be placed downstream of the transformer 10. A secondary winding 16 supplies current to a rectifying bridge 17 having a negative terminal 18 connected to the electrode 2 of the torch 1 through a conductor 19, and a positive terminal 20 connected, through a conductor 21, to a terminal 22 of an inductance 23 whose other terminal 24 is connected through a conductor 25 to the work piece 7 to be treated. An auxiliary control circuit 30 includes a very low voltage safety transformer 31 whose primary winding 32 is connected, through a manual switch 34, to the mains 14 upstream of the switch 15. Connected in parallel to the terminals of a secondary winding 33 of the transformer 31 are:

an indicator light 40 indicating that the auxiliary control circuit 30 carries current;

a control circuit 41 comprising a control winding 42 of the main switch 15 in series with a relay contact 43;

an excitation coil 44 of an electrically operated valve (not shown) inserted in the gas supply conduit.

A terminal 45 of the secondary winding 33 of the transformer 31 is also conneted to the work piece 7 through a circuit including in series a thermal contact 46 which opens in the event of an abnormal rise in temperature and is placed in the windings of the main transformer 10, a contact 47 which closes under the effect of a gas pressure and is placed in the gas supply conduit for the torch, an excitation coil 48 associated with an impedance 49 (capacitor 50 and resistor 51 connected in parallel), this coil 48 causing the closure of the contact 43 in the excited state, the whole being connected, through a unidirectional element 52, to the terminal 24 of the inductance 23, while the negative terminal 18 is connected, through a unidirectional element 53, to the other terminal 54 of the secondary winding 33 of the transformer 31. Further, the terminal 22 of the inductance 23 is connected through a conductor 55 having a resistor 56 to the terminal 45 of the secondary winding 33 of the transformer 31.

The installation operates in the following manner:

The operator closes the switch 34 of the auxiliary circuit 30 and opens the general valve supplying plasma-producing gas, which has for effect to supply current to the very low voltage transformer 31, to ignite the indicator light 40 and to excite the winding 44 of the electrically operated valve, so that the plasma-producing gas reaches and flows in the torch 1, but the main switch 15 is still in its ope position.

The arc is struck by the mutual contact between the nozzle 3 and the work piece 7 and between the electrode 2 and the nozzle 3. The circuit being supplied with current by the transformer 31, the winding 48 is closed through the safety contacts 46 and 47 and the short circuit 2-3-7, which causes the closure of the contact 43 of the relay 48 and consequently the excitation of the relay 42 and thus the closure of the contact 15 closing the supply switch of the main transformer 10. Moving the electrode 2 away from the nozzle 3 forms the welding or cutting arc between the electrode 2 and the work piece 7 and thus establishes the welding or cutting current.

The relay 48 is maintained in the excited state by the voltage at the terminals 22–24 of the inductance 23 which depends on the existence of the welding or cutting current, this voltage ensuring the supply of current to the relay 48 through the conductor 55, the resistor 56, the safety contacts 46,47 and the unidirectional element 52. As soon as the operator extinguishes the welding arc, the relay 48 assumes its state of rest, the contact 43 opens, the relay 42 assumes its state of rest and opens the contact 15.

Note that the installation stops operating also, and independently of the operator, if there is no gas pressure (opening of the contact 47) or if the transformer 10 heats up abnormally (opening of the contact 46). A supervising circuit (light 60 and the unidirectional element 61) indicates in an optical manner the correct state of the gas supply and the non-overheating of the transformer 10. Further, a light 62 connected in series with a unidirectional element 63 optically indicates the good state of the relay 42 and of its contact 15. Preferably, the light 62 is connected in series with a bimetallic strip 64 so that in normal operation this light 62 glows weakly and is extinguished when there is a stoppage in the operation. On the other hand, the light 62 will start to flash in the event that the relay 42 (or its contact 15) is defective owing to the existence of a high voltage at the terminals of the secondary winding 16 of the transformer 10. Preferably, a sound apparatus 5 is connected in parallel to the light 62.

Figure 2:
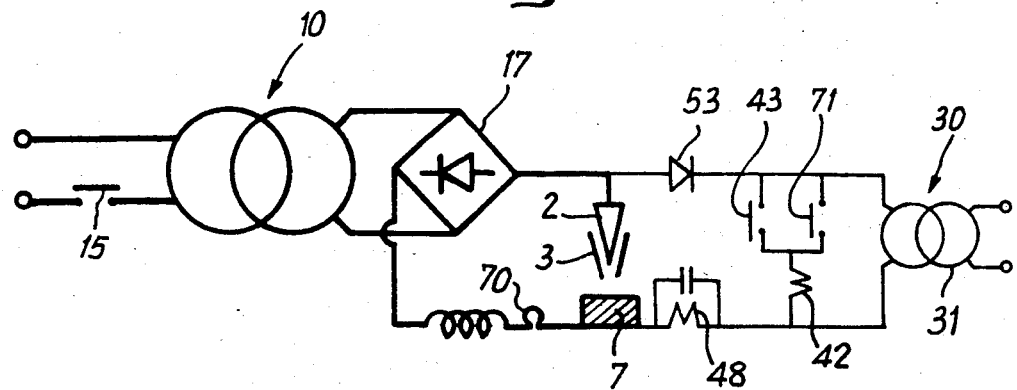
FIGS. 2 and 3 are diagrams of two modifications of the installation according to the invention.

With reference to FIG. 2 in which are shown the main transformer 10, the rectifier 17, the auxiliary circuit 30 having the transformer 31, and the electrode 2, the nozzle 3 and the work piece 7, it will be noted that the maintenance circuit for the relay 42 is ensured, after striking the arc, by an intensity relay 70 which closes a contact 71 connected in parallel to the contact 43.

Figure 3:
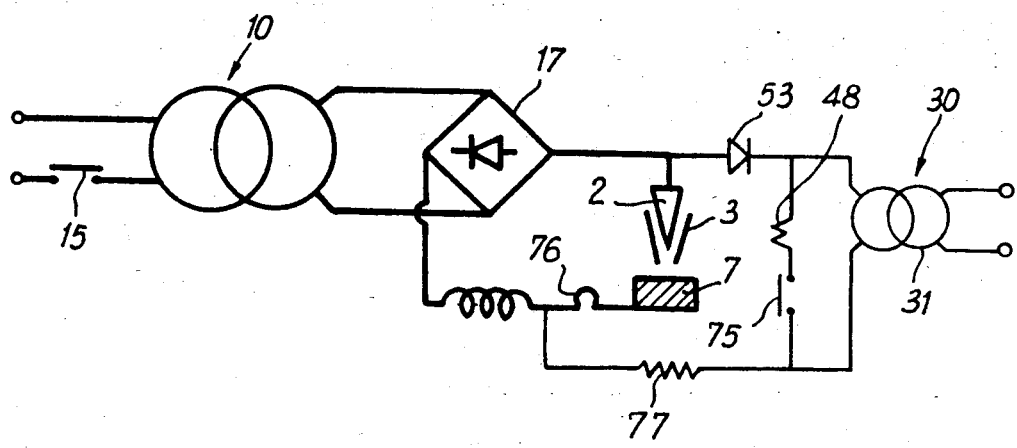

In FIG. 3, the relay 48 directly controls the contact 15 and is connected in series with a contact 75 of an intensity relay 76, the assembly being connected to the terminals of the low voltage transformer 31, on the one hand, and, connected through a resistor 77 and the unidirectional element 53, to the terminals of the assembly comprising the electrode 2, the nozzle 3, the work piece 7 and the intensity relay 76, on the other hand, so that the contact 75 is first closed, owing to the supply of the current to the relay 76 by the low voltage transformer 31 when there exists the short circuit 2-3-7 and then, owing to a welding current, when the switch 15 is closed.

The invention is applicable to the welding or cutting of a work piece by means of an arc gas, such as a plasma-producing gas.

We claim:

1. An installation for controlling the operation of an arc gas welding or cutting torch, comprising an electrode and a nozzle axially movably mounted for movement relative to each other so as to achieve mutual contact when applied against a work piece in opposition to the action of elastically yieldable means for returning the electrode and nozzle to a mutual position in which the electrode and nozzle are spaced a maximum distance apart corresponding to normal operation of the torch, a welding or cutting electric current source, a welding or cutting current circuit connecting said source between the electrode and the work piece to be welded or cut, an arc gas source connected to the torch for supplying arc gas to the torch, said installation further comprising an auxiliary control circuit including a safety low voltage auxiliary source connected between the electrode and the work piece, an electric first means for causing the closure of a switch of the welding or cutting current circuit, which first means is adapted to come into action when there is a mutual contact between the electrode, nozzle and work piece, and second means acting in exclusive dependence on the welding or cutting current for maintaining said first means active.

2. An installation according to claim 1, wherein said second means is an inductance through which the main welding or cutting current passes.

3. An installation according to claim 1, wherein said first means is an excitation winding of a relay having a contact which causes, optionally through a second relay, the closure of said switch of the welding or cutting current circuit.

4. An installation according to claim 3, wherein said second means is an intensity relay controlling a contact arranged to be in parallel with said contact which causes the closure of said switch of the welding or cutting current circuit.

5. An installation according to claim 1, wherein said second means is an intensity relay controlling a contact arranged alone in series with a relay controlling said main switch, the assembly being connected to terminals of the auxiliary source which is connected to the main welding or cutting circuit through a resistor.

6. An installation according to claim 1, wherein said first means is connected in series with a closing contact of a safety pressure controller inserted in a conduit supplying said arc gas.

7. An installation according to claim 1, wherein said first means is connected in series with an opening contact of a safety thermostat placed in a transformer supplying said welding or cutting current.

8. An installation according to claim 1, wherein said first means is connected in series with a closing contact of a safety pressure controller inserted in a conduit supplying said arc gas and with an opening contact of a safety thermostat placed in a transformer supplying said welding or cutting current.

* * * * *